US010823951B2

(12) United States Patent
Deissler et al.

(10) Patent No.: US 10,823,951 B2
(45) Date of Patent: Nov. 3, 2020

(54) METHOD FOR IMAGING IN A MICROSCOPE WITH OBLIQUE ILLUMINATION

(71) Applicant: LEICA MICROSYSTEMS CMS GMBH, Wetzlar (DE)

(72) Inventors: Benjamin Deissler, Butzbach (DE); Albrecht Weiss, Linden (DE); Alexander Weiss, Linden (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 71 days.

(21) Appl. No.: 16/326,937

(22) PCT Filed: Aug. 17, 2017

(86) PCT No.: PCT/EP2017/070882
§ 371 (c)(1),
(2) Date: Sep. 6, 2019

(87) PCT Pub. No.: WO2018/036911
PCT Pub. Date: Mar. 1, 2018

(65) Prior Publication Data
US 2019/0391380 A1 Dec. 26, 2019

(30) Foreign Application Priority Data

Aug. 25, 2016 (DE) .................. 10 2016 115 856

(51) Int. Cl.
*H04N 9/47* (2006.01)
*G02B 21/36* (2006.01)
(Continued)

(52) U.S. Cl.
CPC ............. *G02B 21/365* (2013.01); *G06T 5/20* (2013.01); *G02B 21/082* (2013.01); *G06T 2207/10056* (2013.01)

(58) Field of Classification Search
CPC .. G02B 21/367; G02B 21/365; G02B 21/082; G06T 5/009; G06T 5/20; G06T 2207/10056
(Continued)

(56) References Cited

U.S. PATENT DOCUMENTS

2008/0158550 A1\* 7/2008 Arieli ................. G01N 21/4795
356/73
2012/0057013 A1 3/2012 Ishiwata et al.
(Continued)

FOREIGN PATENT DOCUMENTS

DE          3527426 C1   7/1986
DE   102010042351 B4   2/2012

OTHER PUBLICATIONS

Hiroshi Ishiwata, et al., "A new method of three-dimensional measurement by differential interference contrast microscope", Optics Communications, vol. 260, No. 1, Nov. 21, 2015 (Nov. 21, 2015), pp. 117-126, XP029604753.

*Primary Examiner* — Robert Chevalier
(74) *Attorney, Agent, or Firm* — Leydig, Voit & Mayer, Ltd.

(57) ABSTRACT

A method for imaging in a microscope with oblique illumination includes illuminating an object by an illumination beam path that is obliquely incident on an object plane of the microscope. A microscopic image of the object and a corresponding digital image signal are produced. The digital image signal is processed by digital image processing using a convolution kernel to increase contrast. An increased-contrast digital image is produced from the processed digital image signal.

20 Claims, 4 Drawing Sheets

(51) Int. Cl.
*G06T 5/20* (2006.01)
*G02B 21/08* (2006.01)

(58) Field of Classification Search
USPC .......................... 348/79, 77, 63, 68, 64, 70
See application file for complete search history.

(56) References Cited

U.S. PATENT DOCUMENTS

2012/0086795 A1\* 4/2012 Weiss ..................... G02B 21/16
348/79
2014/0347460 A1 11/2014 Richfield et al.
2016/0025959 A1\* 1/2016 Suzuki ............... G02B 21/0088
348/80

\* cited by examiner

METHOD FOR IMAGING IN A MICROSCOPE WITH OBLIQUE ILLUMINATION

CROSS-REFERENCE TO PRIOR APPLICATIONS

This application is a U.S. National Stage Application under 35 U.S.C. § 371 of International Application No. PCT/EP2017/070882 filed on Aug. 17, 2017, and claims benefit to German Patent Application No. DE 10 2016 115 856.9 filed on Aug. 25, 2016. The International Application was published in German on Mar. 1, 2018, as WO 2018/036911 A1 under PCT Article 21(2).

FIELD

The present invention relates to a method for imaging in a microscope with oblique illumination, wherein an object is illuminated by an illumination beam path that is obliquely incident on the object plane of the microscope, and a microscopic image of the object and a corresponding digital image signal are produced.

BACKGROUND

In bright field microscopy, the method of oblique illumination can usually be used to increase contrast and to produce a plastic relief impression with low-contrast specimens. In so doing, only a decentered section in the aperture diaphragm plane, i.e., a section that is substantially outside of the optical axis of the aperture diaphragm, is illuminated so that the wave fronts of the illuminating light pass through the preparation more or less obliquely, i.e., angled relative to the optical axis within a certain angular range. Due to the asymmetry of the illumination, the differently angled wave fronts do not average out when there is interference in the image, which causes an edge in the object to be portrayed as bright on one side and dark on the other side, so that a relief-like visual impression results.

An examination with oblique incident light is, for example, used when examining wafers, in order to exploit the diffraction effects arising at the structures of the wafer surface so as to image the structures in a contrast-rich and plastic manner. Incident light microscopy and transmitted light microscopy with oblique illumination are advantageously used for phase objects, and represent a technically simple and thus cost-effective alternative to interference microscopy. Generally, Köhler illumination is employed, wherein one-sided oblique illumination can, for example, be achieved by decentering the aperture diaphragm, as proposed in DE 35 27 426 C1. The aperture diaphragm proposed therein can be moved out of the optical axis on both sides.

From German patent DE 10 2010 042351 B4 of the applicant, another configuration for oblique incident light illumination is known in which a diaphragm opening within the aperture diaphragm can be positioned as decentered relative to the optical axis. In this case, the aperture opening is a component of a diaphragm disk which has aperture openings of various diameters. The microscope illumination system proposed therein for oblique incident light illumination can, in principle, also be used in the present invention. Consequently, reference is expressly made at this juncture to details of the configuration and functioning of such a microscope illumination system in the cited document.

Contrasting techniques based upon the described oblique illumination are used for various low-contrast specimen types—in particular, also in connection with microtiter plates. When using oblique illumination, a lateral shift of the image occurs when focusing in the Z direction, i.e., in the direction of the optical axis of the microscope objective. The gained contrast from oblique illumination is all the stronger the more decentered the objective pupil is illuminated. However, when microtiter plates are used, this leads to problems, since, on the one hand, the depth of the well causes geometrically-related shadowing and, on the other, the meniscus on the surface of the liquid causes a shift of the illuminated surface in the objective pupil as a function of the X-Y movement of the specimen.

SUMMARY

In an embodiment, the present invention provides a method for imaging in a microscope with oblique illumination. An object is illuminated by an illumination beam path that is obliquely incident on an object plane of the microscope. A microscopic image of the object and a corresponding digital image signal are produced. The digital image signal is processed by digital image processing using a convolution kernel to increase contrast. An increased-contrast digital image is produced from the processed digital image signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
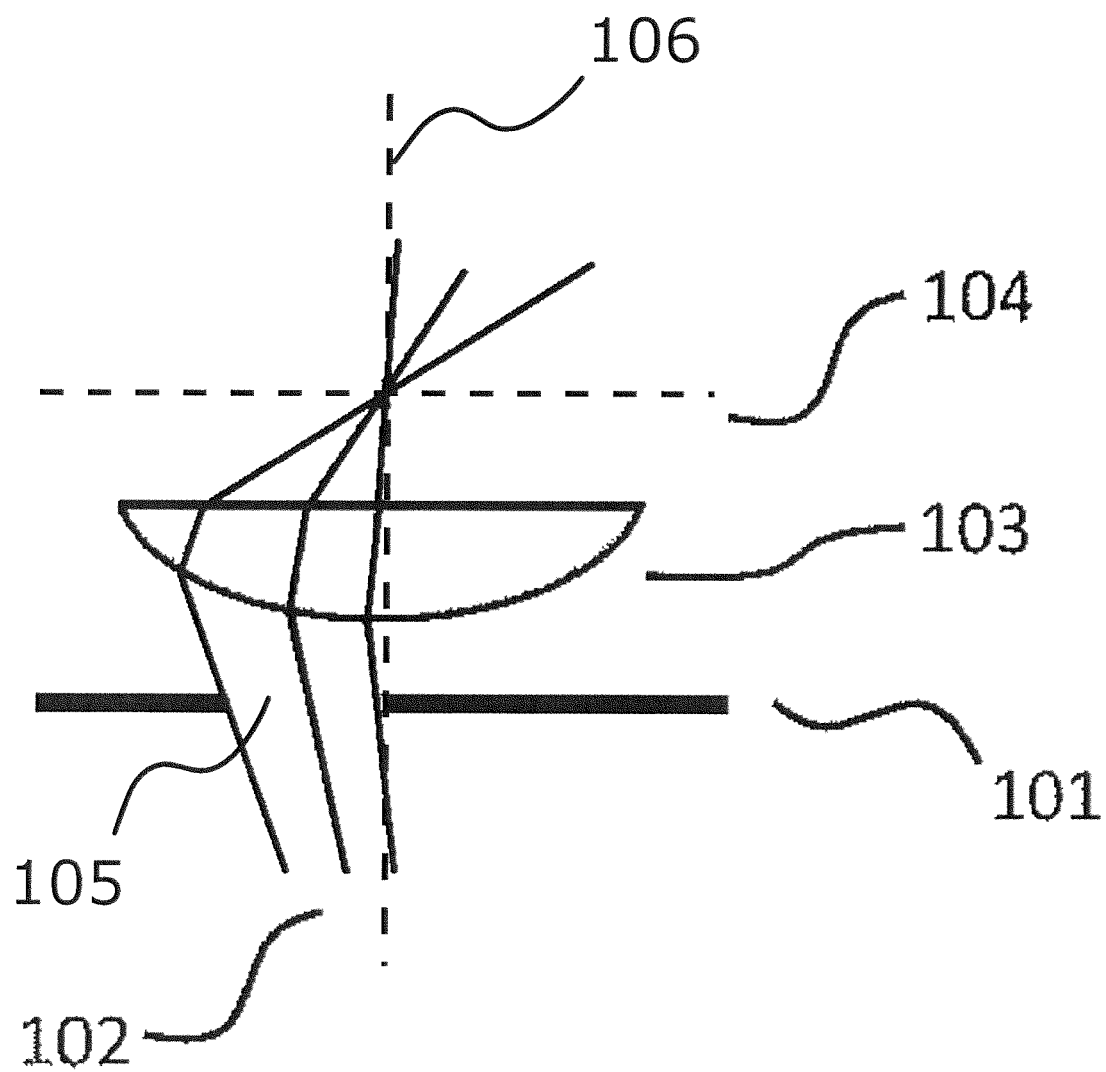
FIG. 1 shows a schematic cross-sectional view of a configuration for oblique illumination, FIG. 2 schematically shows an embodiment of a microscope for imaging with oblique transmitted light illumination, FIG. 3 schematically shows an embodiment of a microscope for imaging with oblique incident light illumination, and FIG. 4 schematically shows the method sequence according to the invention.

In an embodiment, the present invention provides a method for imaging in a microscope with oblique illumination by means of which the imaging improves the contrasting method, and, in particular, the aforementioned disadvantages recognized in the present invention are avoided.

In the method according to an embodiment of the invention for imaging in a microscope with oblique illumination, an object is illuminated by an illumination beam path falling obliquely on the object plane. A microscopic image of this object is produced in a known manner. The microscope considered here basically has a microscope objective, wherein various objectives can often be selected, as well as a tubular optical system. The microscopic image of the object can be viewed directly by a viewer and/or by a camera. To display the image on a digital camera, it is necessary to generate a digital signal from the available microscopic optical image.

Of course, cases are always conceivable in which a digital image, e.g., for documentation purposes, is generated without being directly viewed. According to an embodiment of the invention, the relief-like image impression produced by the oblique illumination is now further enhanced by increased contrast, in that the digital image signal is processed by means of digital image processing using a convolution kernel (also referred to as convolution matrix or "convolution filter") for increased contrast, and an increased-contrast digital image is generated therefrom.

In the case of the low-contrast specimen types considered here, such as exist, for example, in the above-mentioned use of microtiter plates, the sole use of digital image processing to increase contrast and/or to generate a relief impression would have the disadvantage that artifacts, high noise, and an increasing loss of object similarity can easily occur with low-contrast input data. For this reason, such image-processing methods have not been considered in the present application. It has been surprisingly revealed that digital image processing in combination with imaging in a microscope with oblique illumination yields major advantages in the application considered here. Both contrast-increasing effects are mutually reinforcing, without the aforementioned negative effects reducing the advantage of further enhancing increased contrast.

In this case, it is particularly advantageous when the oblique illumination beam path is produced by illuminating a decentered region in or close to an aperture plane of an illumination assembly of the microscope, wherein this illuminated region can be up to one-half a pupil size of an entrance pupil, arranged to be conjugate thereto, of the microscope objective. In this case, the illuminated region can, in particular, be larger than, conventionally, would typically be necessary for producing a sufficient enhancement of contrast and relief impression when imaging with oblique illumination. Typically, to increase contrast, only an outer fourth of the objective pupil is illuminated by oblique illumination (taking into account undesired artifacts). For the method according to an embodiment of the invention, the illuminated region is preferably 100%—in particular, 70%, and, in particular, 50%—larger than necessary for imaging with oblique illumination. This image enhanced in the region of contrast is then further calculated with the assistance of digital image processing to enhance the contrast.

For oblique illumination, only a decentered region and thus only a decentered part of the objective pupil is illuminated with the aid of corresponding diaphragms in or near the aperture diaphragm plane or—which is to be expressly encompassed thereby—in or near a plane conjugate to the aperture diaphragm plane or by controlling light modules located there. When using a Köhler illumination assembly, a configuration can be used to produce oblique illumination, as is known from the aforementioned patent DE 10 2010 042351 B4. Reference is expressly made again to this document with regard to configuration and functioning.

The use of, in particular, square convolution kernels, i.e., for example, 3×3 or 4×4 convolution matrices, is known per se for increasing the contrast of digital images. Such a convolution matrix has negative values on one side of the axis of symmetry, and positive values of the same amount on the other side of the axis of symmetry. The orientation of the axis of symmetry of the matrix determines the direction of the incident light perceived in the relief. The contrast-enhanced relief structure in the microscope image generated by the oblique illumination can be further increased according to an embodiment of the invention by the use of such directional convolution kernels. In particular, for this purpose, convolution kernels of the form $$\begin{pmatrix} -1 & -2 & -1 \\ 0 & 1 & 0 \\ 1 & 2 & 1 \end{pmatrix}, \begin{pmatrix} 0 & -1 & -2 \\ 1 & 1 & -1 \\ 2 & 1 & 0 \end{pmatrix}, \begin{pmatrix} 1 & 0 & -1 \\ 2 & 1 & -2 \\ 1 & 0 & -1 \end{pmatrix}, \begin{pmatrix} 2 & 1 & 0 \\ 1 & 1 & -1 \\ 0 & -1 & -2 \end{pmatrix},$$

$$\begin{pmatrix} 1 & 2 & 1 \\ 0 & 1 & 0 \\ -1 & -2 & -1 \end{pmatrix}, \begin{pmatrix} 0 & 1 & 2 \\ -1 & 1 & 1 \\ -2 & -1 & 0 \end{pmatrix}, \begin{pmatrix} -1 & 0 & 1 \\ -2 & 1 & 2 \\ -1 & 0 & 1 \end{pmatrix} \text{ or } \begin{pmatrix} -2 & -1 & 0 \\ -1 & 1 & 1 \\ 0 & 1 & 2 \end{pmatrix}$$

are used. In this case, it is particularly advantageous when the orientation of the convolution kernel is aligned in relation to the direction of the oblique illumination, such that the contrast-increasing effects are amplified. This is, in particular, the case when the direction from which the oblique illumination strikes the specimen corresponds to the direction of the numerical sequence (2, 1, −2) of the convolution kernel—here considered a vector—wherein it is assumed that the specimen and the image of the specimen are aligned equivalently (north of the image corresponds with north of the sample).

For example, the following convolution kernel is used in an oblique illumination from the north of the image:

$$\begin{pmatrix} 1 & 2 & 1 \\ 0 & 1 & 0 \\ -1 & -2 & -1 \end{pmatrix}$$

Stated generally, an asymmetrical, square convolution kernel is used, in particular, with an axis of symmetry aligned perpendicular to the direction of oblique illumination.

Digital image processing can take place at any desired point, with the existing digital image signal. It is advantageous when the digital image is recorded by a camera and displayed by a central computer (CPU), or on a monitor of the microscope connected thereto. Digital processing then occurs, for example, at any point between the camera and the CPU, e.g., directly in the camera, in an independent module between the camera and CPU, or in the CPU itself. This occurs in real time, so that the method can be used in an online image—for example, to navigate in the object field.

In the digital image processing, the information (for example, one byte for the colors red, green, and blue) for each pixel is recalculated using the corresponding information from the adjacent pixel, with the weighting provided by the convolution kernel.

It is, furthermore, advantageous if the illuminated decentered region is determined in or near a (conjugate) aperture plane of an illumination assembly of the microscope and/or the convolution kernel used as a function of a microscope objective used. If different objectives with a different magnification and aperture are used, the relationship between the oblique illumination and relief filter can be adapted by changing or adapting diaphragms in said aperture plane, and/or by using a different convolution kernel. Sufficient illumination of the object field can thus be ensured, and shadowing minimized.

It should be pointed out that the method according to embodiments of the invention can be used both in a microscope with a finite imaging beam path and in a microscope with an infinite imaging beam path. Furthermore, the illumination beam path can form an incident light illumination beam path or a transmitted light illumination beam path.

In summary, an advantage provided by embodiments of the invention is that a contrast-enhanced image with relief impression can be obtained without the above-described problem being notably apparent, which would, taken alone, be caused by oblique illumination, on the one hand, and digital imaging processing, on the other. The lateral image shift, when focusing, and the noise and loss of object similarity from convolution are minimized. This effect could not be expected. An embodiment of the invention is particularly suitable for the use of specimens in microtiter plates, since, due to the depth of the wells and due to the liquid meniscus, neither oblique illumination alone nor, for example, known phase contrast methods can be used for effective contrast enhancement. Differential interference contrast (DIC) also cannot be used when plastic microtiter plates are utilized, because of the loss of the polarization direction.

Further advantages and embodiments of the invention are given by the description and the accompanying drawings.

It is to be understood that the features mentioned above and the features to be explained in detail below can be used not only in the respective indicated combination, but also in other combinations or alone, without departing from the scope of the present invention.

The basic principle of oblique illumination is shown in FIG. 1. The shown illumination assembly has an aperture diaphragm 101 and a condenser 103. A decentered area 105 of the aperture diaphragm 101 is illuminated by an illumination beam path 102. The decentered region 105 lies outside of the optical axis 106, or lies for the most part outside of said optical axis 106, but can also include this. What is important is that the decentered region 105 is not symmetrical to the optical axis 106, as shown in FIG. 1. The illumination light is collected by a condenser 103 and focused onto the object plane 104. As shown in FIG. 1, the light beams of the illumination beam path 102 strike the object plane 104 at an angle to the optical axis 106. Due to the existing asymmetry, the various angled wave fronts do not average out when there is interference in the image, which leads to the above-described relief impression and increased contrast.

Figure 2:
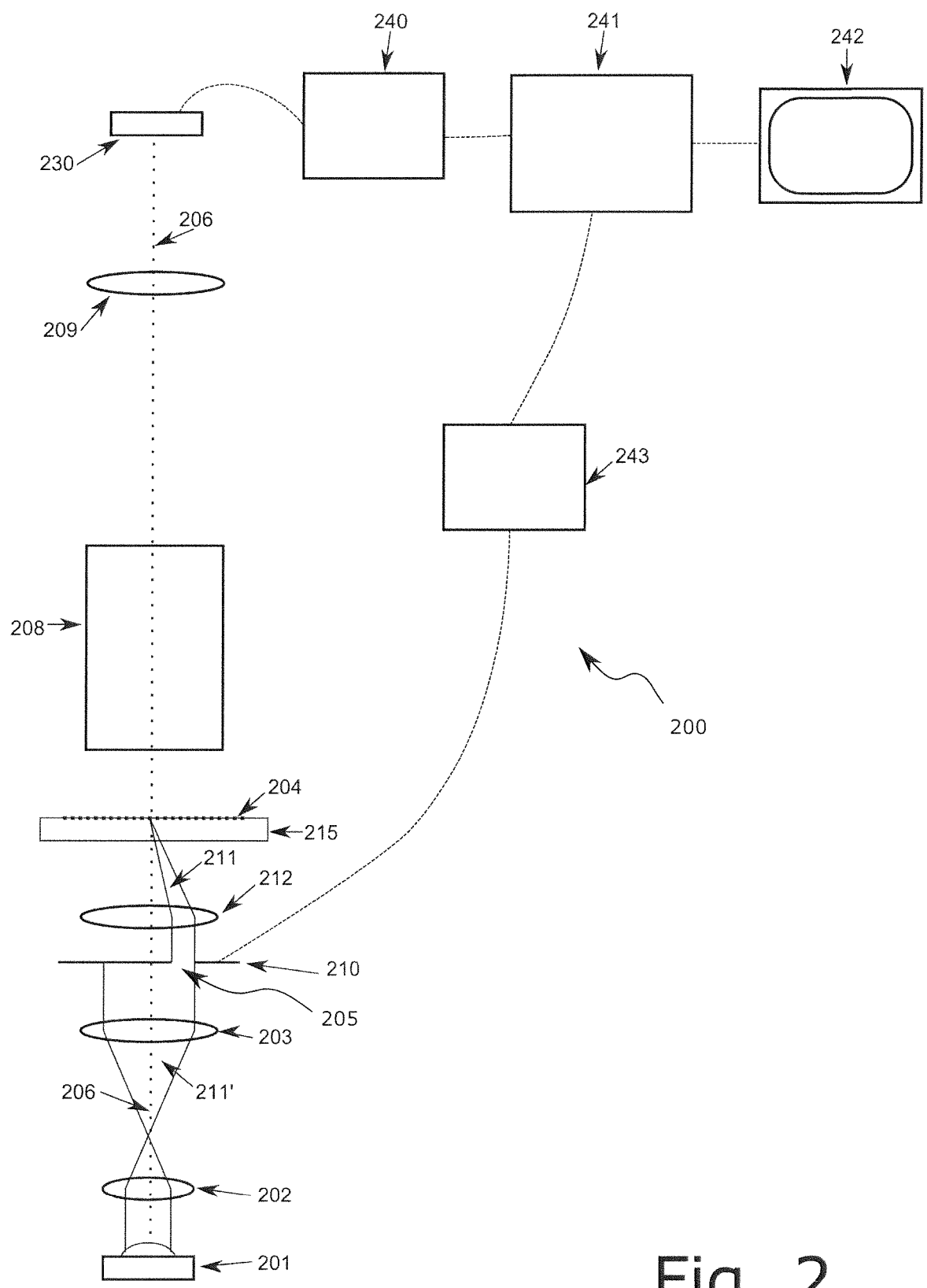

FIG. 2 shows a possible embodiment of a microscope 200 for imaging with oblique illumination, wherein, here, the case of transmitted light illumination is shown. A possible embodiment of oblique illumination in a microscope with transmitted light illumination can be found in FIG. 3.

FIG. 2 shows, very schematically, a microscope 200 having the essential components of the microscope objective 208 and the tubular optical system 209. The objective 208 defines an optical axis 206. The microscope 200 moreover comprises a microscope table 215, on which an object to be investigated microscopically in transmitted light is mounted in an object plane 204. In the present case, a camera 230 records the microscopic optical image and converts it into a digital image. The digital image can be shown on a monitor 242 for a viewer. These procedures are known per se and will therefore not be further explained.

The digital microscope 200 considered here has a central processing unit or CPU 241 for controlling the various microscope components. For example, a diaphragm control 243 is shown that is controlled by the CPU 241. This will be addressed further below. Generally, the CPU 241 also controls the microscope table 215 in order to move it, the selection of an objective 218, and other components.

The illumination assembly of the microscope 200 comprises a light source 201, a downstream lens 202, a further lens 203, and a diaphragm 210 arranged in the aperture plane or near the aperture plane. The diaphragm 210 is downstream from a condenser 212 that focuses the illumination beam path 211 on the object plane 204. The beam path shown here is, optically, the realization of Köhler transmitted-light illumination. For this purpose, the diaphragm 210 is arranged in a plane conjugate to the light source 201. At the same time, the diaphragm 210 is arranged in a plane conjugate to the entrance pupil of the microscope objective 208. In this manner, even illumination of the object plane 204, and hence of the observed preparation section, are achieved. The light source 201 is imaged in the aperture diaphragm plane via the illumination optical system consisting of the lenses 202 and 203. By means of a diaphragm opening 205 located there, a decentered illumination beam path 211 is generated from the original illumination beam path 211'. The diaphragm 210 shown in FIG. 2 can also be a diaphragm disk with various diaphragm openings, as described in detail in DE 10 2010 042 351 B4. Reference is therefore again expressly made to this document, with regard to configuration and functioning.

The image produced by the microscope 200 shown here of the obliquely illuminated preparation on the object plane 204 is recorded by the camera 230. The corresponding digital image signal is digitally reprocessed in an arithmetic unit 240 in the exemplary embodiments shown here. Of course, the arithmetic unit 240 shown here can be a component of the camera 230, as well as a component of the CPU 241. The digital processing can consequently be carried out directly in the camera 230 or directly in the CPU 241, or, as shown here, in the arithmetic unit 240. Digital image processing by means of an—in particular, square—convolution kernel can occur in real time, so that the processed image can be shown as an online image to a viewer without noticeable delay—for example, for navigating in the object field on a monitor 242.

Below, the process of convolving an image pixel of an image section with a directional convolution kernel of the form, $$\begin{pmatrix} -1 & -2 & -1 \\ 0 & 1 & 0 \\ 1 & 2 & 1 \end{pmatrix}$$

is shown as an example, wherein only the information regarding one color (coded in bytes) shall be considered.

Digital Image:

| | | | | |
|---|---|---|---|---|
| ... | ... | ... | ... | ... |
| ... | 4 | 4 | 4 | ... |
| ... | 4 | 4 | 4 | ... |
| ... | 2 | 2 | 2 | ... |
| ... | 2 | 2 | 2 | ... |
| ... | 2 | 2 | 2 | ... |
| ... | 2 | [2] | 2 | ... |
| ... | 4 | 4 | 4 | ... |
| ... | 4 | 4 | 4 | ... |

Increased-Contrast Digital Image:

```
...  ...  ...  ...  ...
...   4    4    4  ...
...  -4   -4   -4  ...
...  -6   -6   -6  ...
...   2    2    2  ...
...   2    2    2  ...
...  10  [10]  10  ...
...  12   12   12  ...
...   4    4    4  ...
...  ...  ...  ...  ...
```

The relevant pixel (underlined) is computed by forming the dot product of the 3×3 image section (the 3×3 square surrounding the boxed pixel in the digital image above) surrounding it with the 3×3 convolution kernel (−1×2+−2× 2+−1×2+0×2+1×2+0×2+1×4+2×4+1×4=10).

In practice, it is particularly advantageous to align the orientation in the above example established by the direction of the numerical sequence (2, 1, −2), which is perpendicular to the axis of symmetry (0, 1, 0), in relation to the direction of oblique illumination—in this case coming from the south—in order to further enhance the increased contrast. Moreover in practice, particularly when there are regular structures in the specimen, the direction of oblique illumination is aligned with reference to the progression of such structures, in order to be able to optimally depict them plastically.

It is particularly advantageous to first choose the size of the illuminated region 205 of the diaphragm 210 in such a way that an image with oblique illumination is produced in a conventional manner. Then the size of the region 205 can be increased—for example, up to illuminating one-half the side of the objective pupil. This is possible without loss of image quality, due to the subsequent digital image processing. To accomplish this, the region 205 is, for example, increased by introducing a somewhat larger diaphragm opening into the illumination beam path 211. To accomplish this, the diaphragm 210 can, for example, be designed as a diaphragm wheel. The diaphragm 210 is controlled by the diaphragm control 243, which for its part is controlled by the CPU 241. It is particularly preferable when the illuminated region 205 is chosen to be about 50-70% larger than is conventionally necessary for imaging with oblique illumination.

For subsequent digital image processing, a suitable convolution kernel is selected, in particular, by the CPU 241, and transferred to the arithmetic unit 240 for image processing. The respective convolution kernel used and/or the illuminated decentered region 205 could, furthermore, be determined, in particular, as a function of the microscope objective 208 used. Depending upon the magnification and aperture of the objective 208, an illuminated region 205 adapted thereto and a convolution kernel adapted thereto may be advantageous. Sufficient illumination of the object can thus be ensured, and shadowing minimized.

The present configuration is, in particular, advantageous for specimens in microtiter plates—in particular, those in plastic wells that are examined by transmitted light illumination.

Figure 3:
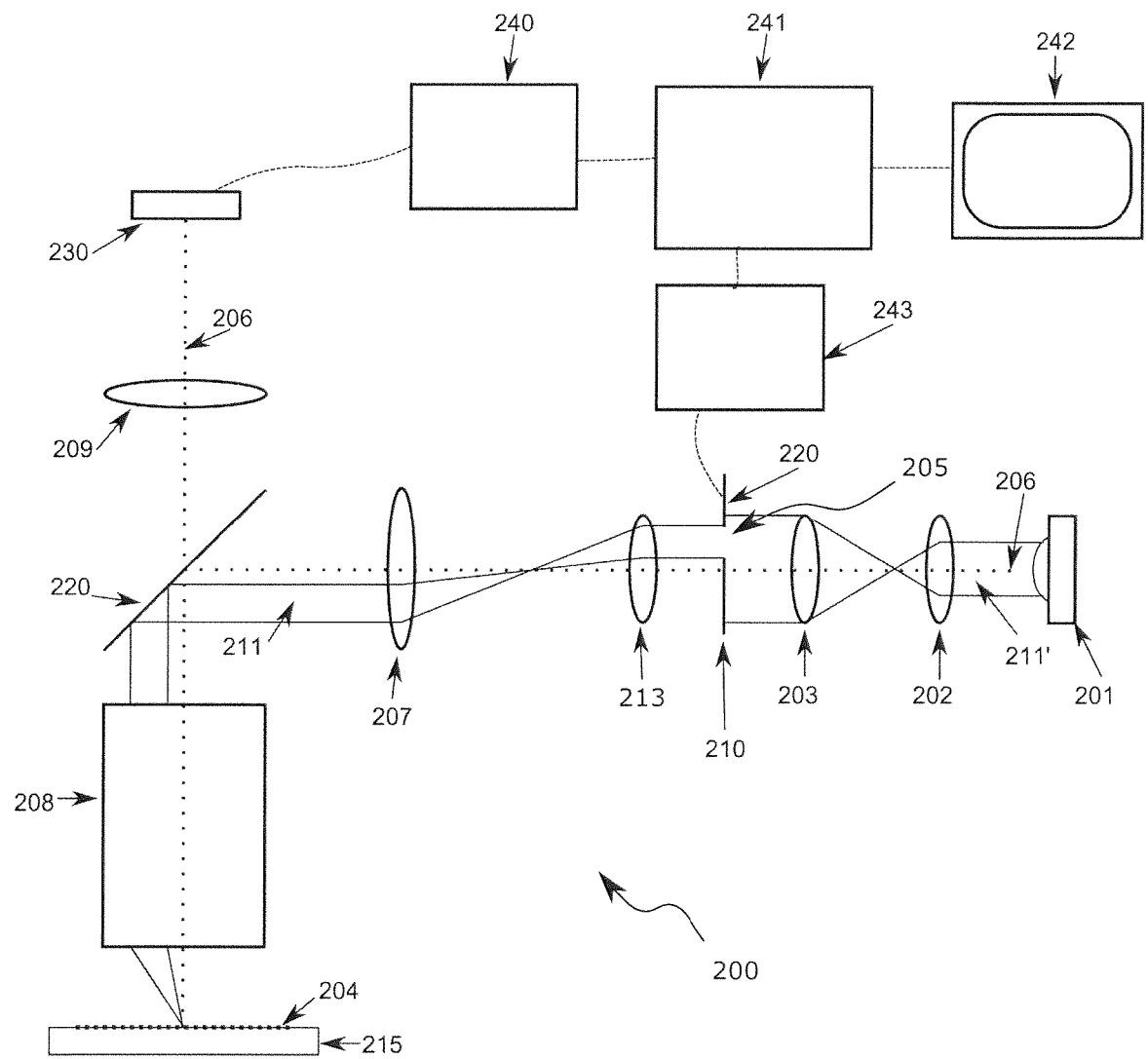

With respect to the embodiment according to FIG. 3, which shows an embodiment of a microscope 200 for imaging with oblique transmitted light illumination, reference is primarily made to the above statements in conjunction with FIG. 2. The same reference numbers indicate identical or substantially equivalent elements as in FIG. 2.

Whereas the illumination assembly of the microscope 200 according to FIG. 2 implements transmitted light illumination, the microscope 200 uses an illumination assembly for incident light illumination. The illumination assembly, in turn, comprises a light source 201 and downstream lenses 202, 203, and a diaphragm 210 arranged in the aperture plane or near the aperture plane. Lenses 202 and 203 define an optical axis 206 of the illumination assembly. A region lying asymmetrical to the optical axis 206 is cut out of the symmetrical illumination beam path 211' by the decentered illuminated region 205 of the aperture 210, and is subsequently used as an illumination beam path 211 for oblique illumination. The two downstream lenses 213 and 207 produce a parallel illumination beam path 211 which is coupled in by a beam splitter 220 in the direction of the optical axis 206 of the microscope objective 208. The microscope objective 208 focuses the illumination beam path 211 onto the object plane 204.

All other details as to imaging in the microscope 200, digital image processing, and controlling the aperture 220 are entirely analogous to those in FIG. 2. Reference is therefore made to the above statements in order to avoid repetition.

Figure 4:
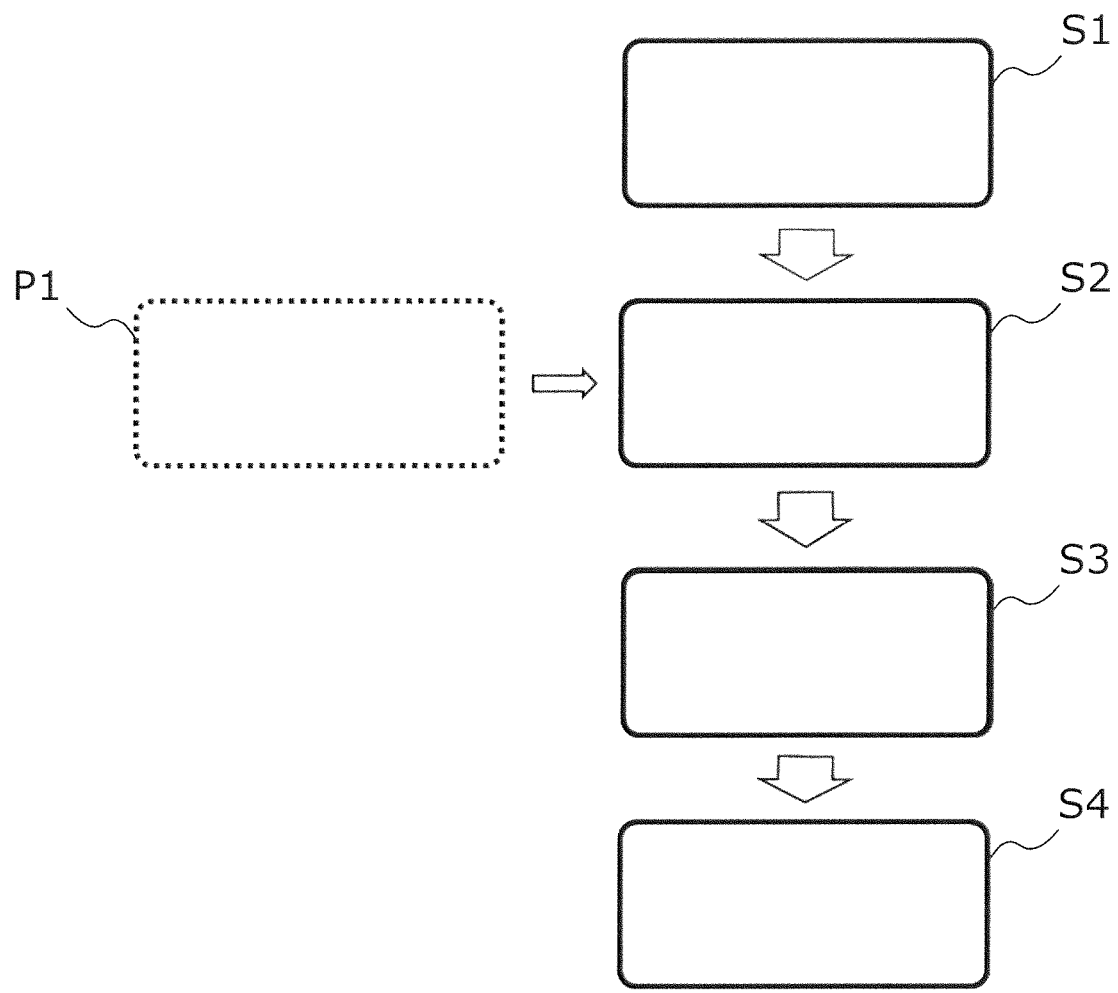

The method is again illustrated briefly in FIG. 4. In step S1, a microscope image with oblique illumination is recorded. In this regard, reference is made to the statements associated with FIG. 2. All of the information on the parameters of oblique illumination (symbolized by the parameters P1) are available to the CPU 241, and are taken into account in the next step S2 when selecting an appropriate convolution kernel. The parameters of oblique illumination include magnification and the aperture of the objective 208 used, as well as the size, geometry, and position of the illuminated region 205 of the aperture 210. After selecting the matching convolution kernel in step S2, the digitized microscopic image with the selected convolution kernel is convolved in the arithmetic unit 240 (step S3). The increased-contrast digital image can, for example, be shown on a monitor 242 in step S4. The method depicted in FIG. 4 can of course also be carried out in the configuration of a microscope according to FIG. 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 Aperture diaphragm
102 Illumination beam path
103 Condenser
104 Object plane
105 Illuminated region
106 Optical axis
200 Microscope
201 Light source
202 Lens
203 Lens
204 Object plane
205 Illuminated region
206 Optical axis
207 Lens
208 Objective
209 Tubular optical system
210 Diaphragm
211, 211'Illumination beam path
212 Condenser
213 Lens
215 Microscope table
220 Beam splitter
230 Camera
240 Arithmetic unit
241 Central processing unit, CPU
242 Monitor
243 Diaphragm control
S1-S4 Method steps
P1 Parameters

The invention claimed is:

1. A method for imaging in a microscope with oblique illumination, the method comprising:
    illuminating an object by an illumination beam path that is obliquely incident on an object plane of the microscope;
    producing a microscopic image of the object and a corresponding digital image signal;
    processing the digital image signal by digital image processing using a convolution kernel to increase contrast; and
    producing an increased-contrast digital image from the processed digital image signal,
    wherein the convolution kernel is used whose orientation is aligned in relation to the direction of the oblique illumination in order to further enhance the increased contrast.

2. The method according to claim 1, wherein the convolution kernel is a square convolution kernel.

3. The method according to claim 1, wherein the convolution kernel is used in the form of a convolution matrix as follows:

$$\begin{pmatrix} -1 & -2 & -1 \\ 0 & 1 & 0 \\ 1 & 2 & 1 \end{pmatrix}, \begin{pmatrix} 0 & -1 & -2 \\ 1 & 1 & -1 \\ 2 & 1 & 0 \end{pmatrix}, \begin{pmatrix} 1 & 0 & -1 \\ 2 & 1 & -2 \\ 1 & 0 & -1 \end{pmatrix}, \begin{pmatrix} 2 & 1 & 0 \\ 1 & 1 & -1 \\ 0 & -1 & -2 \end{pmatrix},$$

$$\begin{pmatrix} 1 & 2 & 1 \\ 0 & 1 & 0 \\ -1 & -2 & -1 \end{pmatrix}, \begin{pmatrix} 0 & 1 & 2 \\ -1 & 1 & 1 \\ -2 & -1 & 0 \end{pmatrix}, \begin{pmatrix} -1 & 0 & 1 \\ -2 & 1 & 2 \\ -1 & 0 & 1 \end{pmatrix} \text{ or } \begin{pmatrix} -2 & -1 & 0 \\ -1 & 1 & 1 \\ 0 & 1 & 2 \end{pmatrix}.$$

4. The method according to claim 3, wherein the convolution kernel is used whose orientation is aligned in relation to the direction of the oblique illumination in order to further enhance the increased contrast, and wherein a direction of a numerical sequence, considered as a vector, of the convolution kernel corresponds with the direction from which the oblique illumination strikes the object.

5. The method according to claim 1, wherein the illumination beam path is produced by illuminating a decentered region in or close to an aperture plane of an illumination assembly of the microscope.

6. The method according to claim 5, wherein the illuminated region is selected to be larger than is necessary for imaging with oblique illumination.

7. The method according to claim 6, wherein the illuminated region is selected to be 100% larger than is necessary for imaging with oblique illumination.

8. The method according to claim 5, wherein the illuminated region is selected to be up to one-half the pupil size of an entrance pupil, arranged to be conjugate thereto, of the microscope objective.

9. The method according to claim 5, wherein the illuminated decentered region and/or the convolution kernel used is determined as a function of the microscope objective used.

10. The method according to claim 2, wherein the convolution kernel is symmetrical.

11. A method for imaging in a microscope with oblique illumination, the method comprising:
    illuminating an object by an illumination beam path that is obliquely incident on an object plane of the microscope;
    producing a microscopic image of the object and a corresponding digital image signal;
    processing the digital image signal by digital image processing using a convolution kernel to increase contrast; and
    producing an increased-contrast digital image from the processed digital image signal,
    wherein the convolution kernel is a square convolution kernel.

12. The method according to claim 11, wherein the convolution kernel is symmetrical.

13. The method according to claim 11, wherein the illumination beam path is produced by illuminating a decentered region in or close to an aperture plane of an illumination assembly of the microscope, and wherein the illuminated decentered region is selected to be 100% larger than is necessary for imaging with oblique illumination.

14. The method according to claim 11, wherein the illumination beam path is produced by illuminating a decentered region in or close to an aperture plane of an illumination assembly of the microscope, and wherein the illuminated region is selected to be up to one-half the pupil size of an entrance pupil, arranged to be conjugate thereto, of the microscope objective.

15. The method according to claim 11, wherein the illumination beam path is produced by illuminating a decentered region in or close to an aperture plane of an illumination assembly of the microscope, and wherein the illuminated decentered region and/or the convolution kernel used is determined as a function of the microscope objective used.

16. A method for imaging in a microscope with oblique illumination, the method comprising:

illuminating an object by an illumination beam path that is obliquely incident on an object plane of the microscope;

producing a microscopic image of the object and a corresponding digital image signal;

processing the digital image signal by digital image processing using a convolution kernel to increase contrast; and producing an increased-contrast digital image from the processed digital image signal, wherein the convolution kernel is used in the form of a convolution matrix as follows:

$$\begin{pmatrix} -1 & -2 & -1 \\ 0 & 1 & 0 \\ 1 & 2 & 1 \end{pmatrix}, \begin{pmatrix} 0 & -1 & -2 \\ 1 & 1 & -1 \\ 2 & 1 & 0 \end{pmatrix}, \begin{pmatrix} 1 & 0 & -1 \\ 2 & 1 & -2 \\ 1 & 0 & -1 \end{pmatrix}, \begin{pmatrix} 2 & 1 & 0 \\ 1 & 1 & -1 \\ 0 & -1 & -2 \end{pmatrix},$$

$$\begin{pmatrix} 1 & 2 & 1 \\ 0 & 1 & 0 \\ -1 & -2 & -1 \end{pmatrix}, \begin{pmatrix} 0 & 1 & 2 \\ -1 & 1 & 1 \\ -2 & -1 & 0 \end{pmatrix}, \begin{pmatrix} -1 & 0 & 1 \\ -2 & 1 & 2 \\ -1 & 0 & 1 \end{pmatrix} \text{ or } \begin{pmatrix} -2 & -1 & 0 \\ -1 & 1 & 1 \\ 0 & 1 & 2 \end{pmatrix}.$$

17. The method according to claim 16, wherein the convolution kernel is used whose orientation is aligned in relation to the direction of the oblique illumination in order to further enhance the increased contrast, and wherein a direction of a numerical sequence, considered as a vector, of the convolution kernel corresponds with the direction from which the oblique illumination strikes the object.

18. The method according to claim 16, wherein the illumination beam path is produced by illuminating a decentered region in or close to an aperture plane of an illumination assembly of the microscope, and wherein the illuminated decentered region is selected to be 100% larger than is necessary for imaging with oblique illumination.

19. The method according to claim 16, wherein the illumination beam path is produced by illuminating a decentered region in or close to an aperture plane of an illumination assembly of the microscope, and wherein the illuminated region is selected to be up to one-half the pupil size of an entrance pupil, arranged to be conjugate thereto, of the microscope objective.

20. The method according to claim 16, wherein the illumination beam path is produced by illuminating a decentered region in or close to an aperture plane of an illumination assembly of the microscope, and wherein the illuminated decentered region and/or the convolution kernel used is determined as a function of the microscope objective used.

* * * * *